United States Patent [19]

Graham et al.

[11] 4,079,236

[45] Mar. 14, 1978

[54] METHOD AND APPARATUS FOR MONITORING THE AXIAL POWER DISTRIBUTION WITHIN THE CORE OF A NUCLEAR REACTOR, EXTERIOR OF THE REACTOR

[75] Inventors: Kingsley F. Graham, Franklin Township, Westmoreland County; Raj Gopal, Churchill Borough, both of Pa.

[73] Assignee: Westinghouse Electric Corporation, Pittsburgh, Pa.

[21] Appl. No.: 664,114

[22] Filed: Mar. 5, 1976

[51] Int. Cl.² .......................................... G21C 17/00
[52] U.S. Cl. ................................. 364/504; 176/19 R
[58] Field of Search ............... 235/151.21; 176/19 R, 176/20, 26, 28

[56] References Cited

U.S. PATENT DOCUMENTS

| | | | |
|---|---|---|---|
| 3,751,333 | 8/1973 | Drummond et al. | 176/19 R |
| 3,769,156 | 10/1973 | Brecy | 176/19 R |
| 3,845,311 | 10/1974 | Fujii | 176/19 R X |
| 3,930,936 | 1/1976 | Aleite et al. | 176/19 R |
| 3,932,211 | 1/1976 | Loving, Jr. | 176/19 R |

Primary Examiner—Edward J. Wise
Attorney, Agent, or Firm—D. C. Abeles; Z. L. Dermer

[57] ABSTRACT

A method and apparatus for establishing the axial flux distribution of a reactor core from monitored responses obtained exterior of the reactor. The monitored responses obtained exterior of the reactor. The monitored responses are obtained from at least three axially spaced flux responsive detectors that are positioned within proximity of the periphery of the reactor core. The detectors provide corresponding electrical outputs representative of the flux monitored. The axial height of the core is figuratively divided at a plurality of space coordinates sufficient to provide reconstruction in point representation of the relative flux shape along the core axis. The relative value of flux at each of the spaced coordinates is then established from a sum of the electrical outputs of the detectors, respectively, algebraically modified by a corresponding preestablished constant.

15 Claims, 14 Drawing Figures

METHOD AND APPARATUS FOR MONITORING THE AXIAL POWER DISTRIBUTION WITHIN THE CORE OF A NUCLEAR REACTOR, EXTERIOR OF THE REACTOR

BACKGROUND OF THE INVENTION

This invention pertains generally to methods and apparatus for monitoring nuclear reactors, and more particularly, to such methods and apparatus that employ parameters that are monitored exterior of the reactor core.

Generally, nuclear reactors contain a reactive region commonly referred to as the core, in which sustained fission reactions occur to generate heat. The core includes a plurality of elongated fuel rods comprising fissile material, positioned in assemblies and arranged in a prescribed geometry governed by the physics of the nuclear reaction. Neutrons bombarding the fissile material promote the fissionable reaction which, in turn, releases additional neutrons to maintain a sustained process. The heat generated in the core is carried away by a cooling medium, which circulates among the fuel assemblies and is conveyed to heat exchangers which in turn produce steam for the production of electricity.

Commonly, in pressurized water reactors, a neutron absorbing element is included within the cooling medium (which also functions as a moderator) in controlled variable concentrations to modify the reactivity, and thus the heat generated within the core, when required. In addition, control rods are interspersed among the fuel assemblies, longitudinally movable axially within the core, to control the core's reactivity and thus its power output. There are three types of control rods that are employed for various purposes. Full length rods, which extend in length to at least the axial height of the core, are normally employed for reactivity control. Part length control rods, which have an axial length substantially less than the height of the core, are normally used for axial power distribution control. In addition, reactor shut-down control rods are provided for ceasing the sustained fissionable reaction within the core and shutting down the reactor. The part length rods and full length control rods are arranged to be incrementally movable into and out of the core to obtain the degree of control desired.

As a byproduct of the fissionable reaction, through a process of beta decay of radioactive iodine, xenon is created. Xenon has the property of having a large neutron absroption cross-section and, therefore, has a significant effect on the power distribution within the core and reactivity control. While the other forms of reactivity management are directly responsive to control, the xenon concentration within the core creates serious problems in reactor control in that it exhibits a relatively long decay period and requires up to at least 20 hours after a power change to reach a steady state value.

While the radial power distribution of the core is fairly predictable, due to the prescribed arrangement of fuel assemblies and the positioning of control rods which are symmetrically situated radially throughout the core, the axial power distribution can vary greatly during reactor operation. Core axial power distribution has created many problems throughout the history of reactor operation for many reasons. Normally, coolant flow through the fuel assemblies is directed from a lower portion of the core to the upper core regions, resulting in a temperature gradient axially along the core. Changes in the rate of the fissionable reaction, which is temperature dependent, will thus vary the axial power distribution. Secondly, the axial variation in the power distribution varies the xenon axial distribution, which further accentuates the variations in power axially along the core. This can lead to a xenon induced axial power distribution oscillation which can, late in core life, be unstable without corrective operator intervention. Thirdly, insertion of the control rods from the top of the core, without proper consideration of the past operating history of the reactor, can worsen the axial power peaking.

The change in reactor power core output which is required to accommodate a change in electrical output of an electrical generating plant is commonly referred to as load follow. One load follow control program currently recommended by reactor vendors utilizes the movement of the full length control rods for power level increases and decreases and the part length control rods to control xenon induced spacial axial power oscillations and shape the axial power profile. Changes in reactivity associated with changes in the xenon concentration are generally compensated for by corresponding changes in the concentration of the neutron absorbing element within the core coolant or moderator. In this mode of operation, the part length rods are moved to maintain the axial offset within some required band, typically about plus or minus 15%. The axial offset is a useful parameter for measuring the axial power distribution and is defined as:

$$A.O. = \frac{P_t - P_b}{P_t + P_b}$$

where $P_t$ and $P_b$ denote the fraction of power generated in the top half and the bottom half of the core, respectively, as measured generally by two section axially aligned ex-core detector assemblies positioned around the periphery of the reactor. No effort is made to maintain the inherent core axial power profile aside from maintaining the axial offset within the required band. The part length rods are moved to minimize and reduce the axial offset independent of the previously established steady state axial offset. This process induces a constant fluctuation of the axial offset during sustained load follow operation, which results in a number of undesirable operating conditions. For one thing, axial power pinching, which is a large, axially centered power peak, can occur with a low or zero axial offset. Such power peaks result in a reactor power penalty which requires the reactor to be operated at a reduced level so that such peaks do not exceed conservative specified magnitudes. The conservative limitations are imposed due to the inadequacies of present ex-core maintaining systems which do not have the capability of identifying the power level in the center of the core. Secondly, severe changes can occur in the axial power profile of a transient nature during large load changes due to the heavy insertion of control rods at reduced power levels. Thirdly, large xenon transients occur upon coming back to power, resulting in occurrences such as axial power oscillations. Fourthly, improper part length rod usage can produce severe axial power distribution which aren't readily identified by present ex-core detector systems. Fifthly, increased hot channel factors result (which are hot spots which occur within the cooling channels among the fuel assemblies) and require reduction in the power rating of the reactor to accommodate the severe transients and/or adverse power profiles. Finally, no protection currently exists against severe axial pinching with small axial offsets.

Due to the many adverse operating conditions experienced in operating a nuclear reactor during load follow, many reactor vendors recommend operating the reactor at a constant power output without a load follow capability. This lack of versatility in plant operation limits the utility of reactors and requires that fossil-fuel electric generating plants be sustained to maintain the differences in capacity required with load changes.

To establish an effective load follow capability, a substantially constant axial power profile will have to be maintained throughout load operation. Application Ser. No. 501,569, filed Aug. 29, 1974 addresses this problem by maintaining a substantially symmetric xenon axial profile. However, to effectively maintain a substantially constant axial flux profile, a monitoring system is required that has the capability of substantially reconstructing the flux axial pattern within the core so that variations therein can be accurately compensated for before a xenon maldistribution is effected.

While the in-core flux monitoring system described in U.S. Pat. No. 3,932,211, issued Jan. 13, 1976 is capable of providing an accurate picture of the axial flux profile, employing in-core detectors, such detectors being subject to the high flux environment of the core, are susceptible to early burn-out if employed consistently for this purpose. Generally, such detectors are employed to provide flux maps at start-up of the reactor or periodically thereafter to calibrate the ex-core detectors or, as described in the afore-cited application, after large control rod movements are initiated. However, an effective core monitoring system will require a continuous core map of the axial flux profile to be an effective tool. The ex-core detectors have been employed in the past for this purpose because they have been demonstrated to be more reliable, being in a lower flux, dry, low temperature, lower relative pressure environment outside of the pressure vessel.

Accordingly, a new flux monitoring system is desired that can provide an accurate picture of the axial flux profile over the entire height of the core. Further, such a system is desired that has a reliability comparable to that of the ex-core detectors with the degree of accuracy and definition obtained from in-core movable detector systems.

SUMMARY OF THE INVENTION

Briefly, the method and apparatus of this invention overcomes the inadequacies of the prior art by providing a reconstruction of the relative axial flux distribution within the core from reactor flux signals monitored externally of the core. The reactor flux signals are monitored by at least three detectors, responsive to the measured flux to provide a representative electrical output. The flux responsive detectors are respectively positioned exterior of the core, centered about corresponding spaced planes perpendicularly bisecting the core axis. Means are provided for electrically establishing the relative value of flux at a plurality of spaced axial coordinates sufficient to provide a meaningful reconstruction in point representation of the relative flux shape along the axis from a sum of the detector outputs, respectively, algebraically modified by corresponding preestablished constants.

In one preferred embodiment, the means for electrically establishing the relative value of flux at each axial coordinate employs the sum of the detector outputs, each respectively multiplied by a corresponding preestablished constant.

Accordingly, the flux distribution at substantially any point within the core can be obtained with the same reliability associated with ex-core detector responses.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
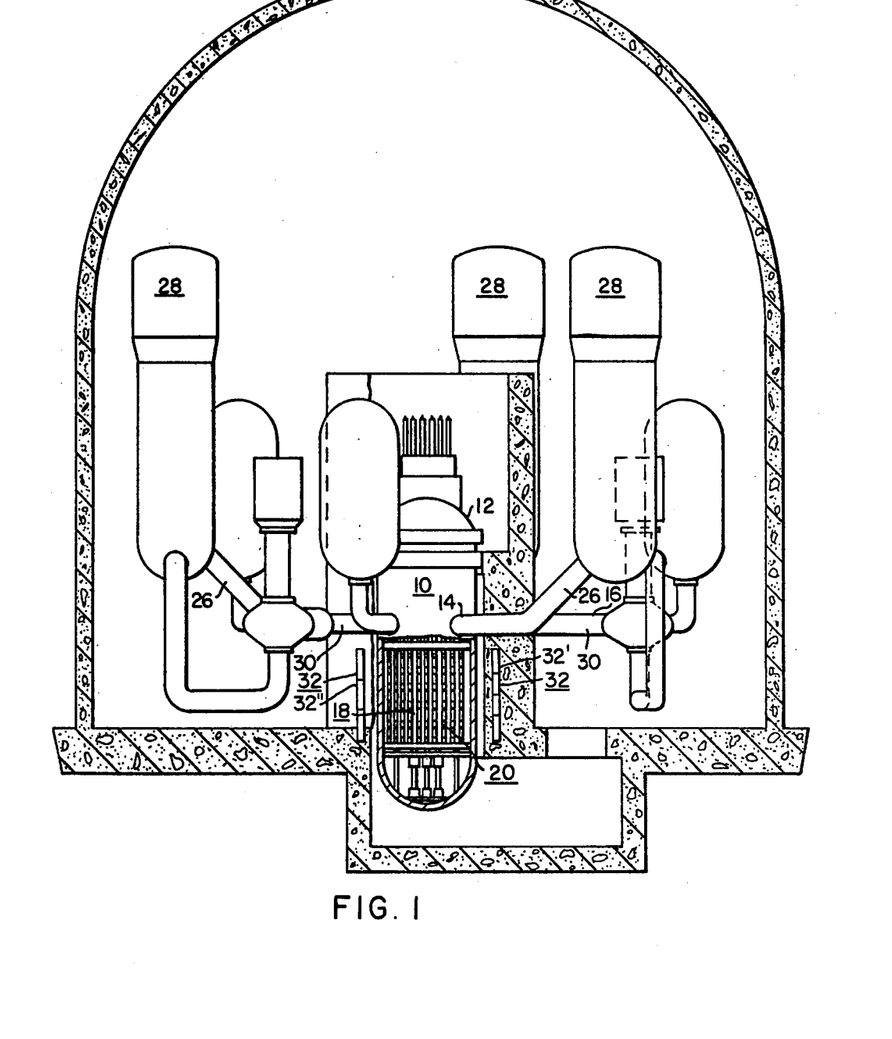
FIG. 1 is a plan view of a typical nuclear reactor containment arrangement employing two embodiments of the ex-core detector arrangements of this invention.

FIG. 1 shows a schematic representation of a typical pressurized water reactor which can employ the method and apparatus of this invention to more accurately monitor the axial flux profiles within the core to avoid the operating difficulties experienced by the prior art. The reactor of FIG. 1 includes a vessel 10 which forms a pressurized container when sealed by its head assembly 12. The vessel has coolant flow inlet means 16 and coolant flow outlet means 14 formed integral with and through its cylindrical walls. As is known in the art, the vesself 10 contains a nuclear core 18 of the type previously described and more fully illustrated in FIG. 2, consisting mainly of a plurality of clad nuclear fuel elements arranged in assemblies 20 which generate substantial amounts of heat, depending primarily upon the position of the part length and full length control rods, previously described. The heat generated by the reactor core 18 is conveyed from the core by coolant flow entering through inlet means 16 and exiting through outlet means 14. Generally, the flow exiting through outlet means 14 is conveyed through an outlet conduit 26 to a heat exchange steam generator system 28, wherein the heated coolant flow is conveyed through tubes which are in heat exchange relationship with water which is utilized to produce steam. The steam produced by the generator is commonly utilized to drive a turbine for the production of electricity. The flow of coolant is conveyed from the steam generator 28 through a cool leg conduit 30 to inlet means 16. Thus, a closed recycling primary or steam generating loop is provided with coolant piping coupling the vessel 10 and the steam generator 28. The vessel illustrated in FIG. 1 is adaptable for three such closed fluid flow systems or loops, though, it should be understood that the number of such loops varies from plant to plant and commonly two, three, or four are employed.

In the production of thermal power within the core, important parameters affecting the axial distribution, as previously explained, are the level of control rod insertion of both the full length and part length rods, the burnup history of the core, the power level of the reactor and the xenon distribution. Without constant surveillance of the axial flow distribution throughout the axial height of the core, it would be imperative to monitor and have full knowledge of the past history of each of these parameters in order to establish a substantially flat axial flux distribution to achieve a load follow capability. These important parameters are measured from information obtained from the control rod position indication system (such as the system described in U.S. Pat. No. 3,858,191, issued Dec. 31, 1974), the in-core thermocouples, the resistance temperature detectors within the coolant piping and the ex-core neutron detectors 32 illustrated in FIG. 1.

Presently, in operating plants, the ex-core detectors 32 are divided midway along the axial height of the core to provide two independently responsive flux sensitive areas respectively proximate the upper and lower core sections. The difference in outputs between the upper and lower detector sections normalized to the relative power of the core provides a measure of the axial offset normally employed to maintain a relative balance between the flux distribution within the upper and lower portions of the core, as previously explained.

The detectors 32" and 32' illustrated in FIG. 1 have been modified in accordance with this invention to respectively provide three and four flux responsive sections equally divided along the axial height of the core. While normally the ex-core detector arrangments, which are positioned symmetrically around the core in a normal operating reactor, would all have the same number of axial sections, the detectors represented by 32' and 32" are provided in this instance to illustrate two separate embodiments of this invention. While splitting the axial length of the ex-core detectors into three, four or even an infinite number of sections will not remedy the problem of flux cross-talk between adjacent axial locations, the method and apparatus that this invention employs to process the signals thus obtained will provide a representative reconstruction of the flux distribution throughout the axial height of the core. The effect of cross-talk can be minimized, however, by adapting the improved configuration illustrated in FIG. 3 where each of the detector sections are axially spaced from each other. For a 12 ft. core the symmetric axial spacing of four approximately 10 in. detector sections has been shown experimentally to provide effective results.

Figure 2:
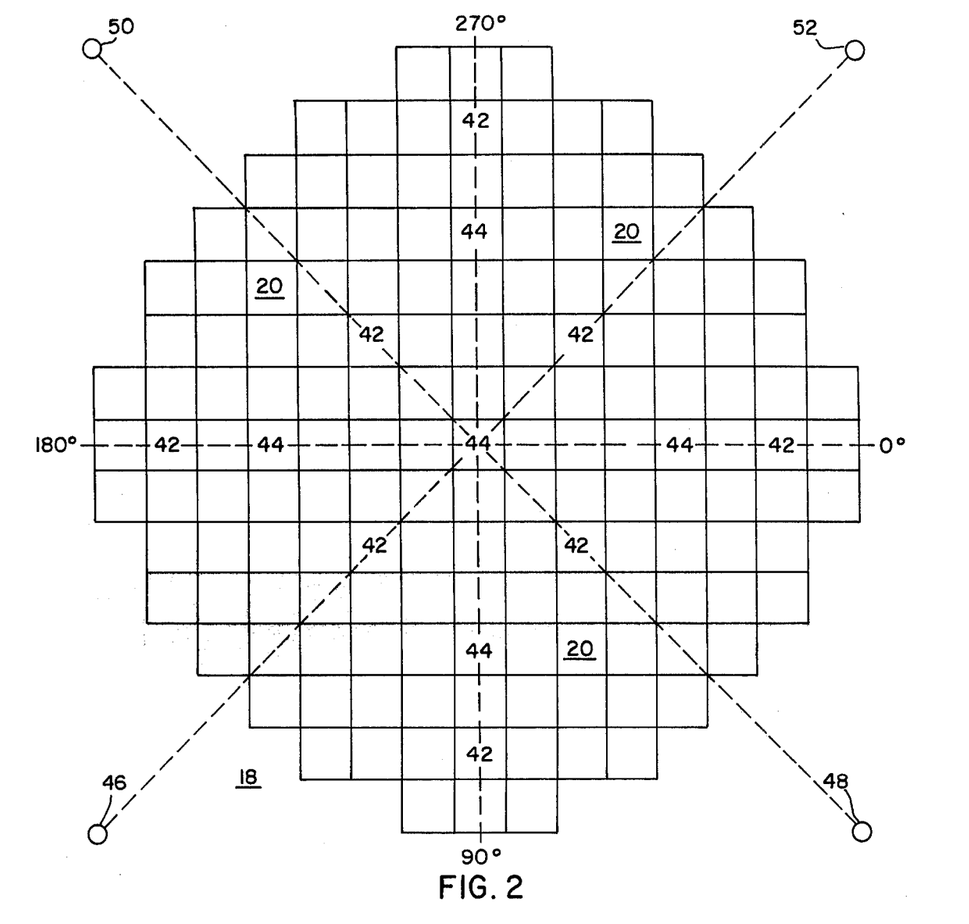
FIG. 2 is a schematic view of a nuclear core showing the relative positioning of the fuel assemblies, control rods and ex-core detectors.

FIG. 2 illustrates a plan view of a typical pressurized water reactor nuclear core 18. The core locations 42 and 44 respectively identify the full length and part length control rod locations employed during full power operation. The remaining core locations 20 generally refer to fuel assembly positions with some positions reserved for other control applications. It can thus be appreciated that the reactor core is designed to be symmetrical about its central axis. During power operation, the power distribution in the core is monitored at a plurality of ex-core detector locations 46, 48, 50 and 52, symmetrically positioned around the periphery of the vessel. Each detector provides corresponding flux information on an adjacent quadrant of the core. Although in this particular embodiment the core is illustrated as separated into quadrants by the detector assemblies located on the core diagonals, it should be appreciated that the quadrants could also be defined by locating the detector assemblies on the core flats at the 0°, 90°, 180° and 270° locations. Thus, in the embodiment illustrated, the flux measurements detected by detector 2 are representative of the power generated in the core quadrant bounded by the 0° axis and the 270° axis, each of which bisects the horizontal plane of the plan view illustrated in FIG. 2 and should be distinguised from the vertical core axis over which the axial flux profile is measured. It should be appreciated from the symmetrical arrangement of core components that the power in each quadrant of the core will be representative of the power in each of the other core quadrants. Thus, the multi-section detectors 32' or 32" are positioned in accordance with this invention in the ex-core detector locations 46, 48, 50 and 52. However, for the purpose of understanding the processing of the detector outputs in accordance with this invention, only one of the detector ex-core locations will be considered, so it is emphasized that the remaining detector locations are processed in the same manner.

Figure 3:
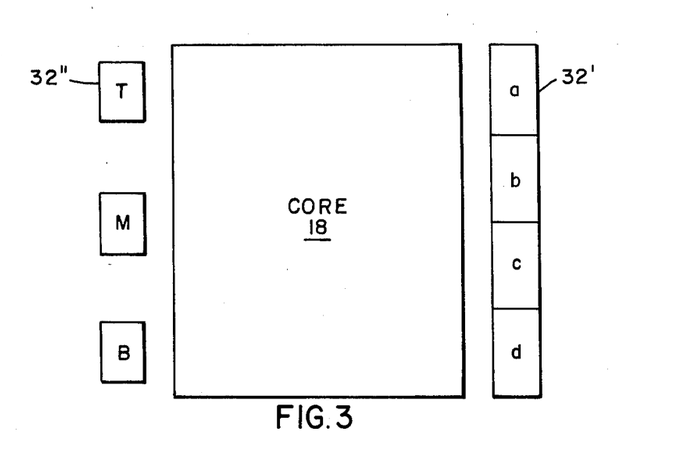
FIG. 3 is a schematic view of an axial cross-section of the core and relative arrangement of two separate embodiments of ex-core detectors employed by this invention.

FIG. 3 illustrates a schematic axial view of the core 18 having three discrete detector sections 32" symmetrically positioned and respectively identified T, M and B corresponding to the top, middle and bottom locations along the axial length of the core. A four detector arrangement 32' is positioned diametrically opposite the detectors 32" and includes four adjacent detector sections respectively identified from the core top to the core bottom by $a$, $b$, $c$ and $d$. The following description will address the processing of outputs from each of these detector arrangements in accordance with this invention.

Generally, in accordance with the method of this invention, the value of flux at each coordinate along the axial length of the core can be established from a sum of the electrical outputs respectively, algebraically modified by a corresponding preestablished constant, which is obtained by initial calibration, and recalibrated periodically during the course of the core life with depletion of the fuel. It should be further appreciated that these constants depend to a large degree on the physics of the plant and will thus vary from plant to plant and from fuel cycle to fuel cycle.

In accordance with one embodiment of the method of this invention, the axial power shapes of the core are reconstructed from multi-section detector responses by a Fourier series of sine functions bounded by the extrapolated axial length of the core. Three terms of a Fourier series expansion can be calculated from a three section detector response, four from a four section detector response, and n from an n section detector response. The axial power distribution is thus represented as:

$$\phi_z = C_1 \text{Sin} Z + C_2 \text{Sin} Z + C_3 \text{Sin} Z + \ldots + C_n \text{Sin}(nZ) \qquad (1)$$

where $Z = 0$ is the extrapolated boundary at the top of the core and $Z = \pi$ (180°) is the extrapolated boundary at the bottom of the core.

The C's are obtained from the multi-section detector responses. The first step is to correlate the detector response with the power sharing between axial segments of the core. In general, the detector currents for a three section ex-core detector arrangement such as 32° are related to power as:

$$L_T = A_{11} P_T + A_{12} P_M + A_{13} P_B \qquad (2)$$

$$L_M = A_{21} P_T + A_{22} P_M + A_{23} P_B \qquad (3)$$

$$L_B = A_{31} P_T + A_{32} P_M + A_{33} P_B \qquad (4)$$

where: $P_T$ equals the power in the top third of the core; $P_M$ equals the power in the middle third of the core; $P_B$ equals the power in the bottom third of the core; and $A_{ij}$ are constant coefficients for a given detector installation — where $i$ and $j$ are integers which vary between one and $n$ and where for this embodiment $n$ equals the number of detector sections. Equations (2), (3) and (4) can be written in matrix form as:

$$\begin{bmatrix} L_T \\ L_M \\ L_B \end{bmatrix} = \begin{bmatrix} A_{11} A_{12} A_{13} \\ A_{21} A_{22} A_{23} \\ A_{31} A_{32} A_{33} \end{bmatrix} \times \begin{bmatrix} P_T \\ P_M \\ P_B \end{bmatrix} \qquad (5)$$

The matrix elements $A_{ij}$ can be obtained by fitting the observed detector currents with observed axial power distributions obtained from in-core maps where: $L_T$ is the response obtained from detector T; $L_M$ is the response obtained from detector M and $L_B$ is the response obtained for detector B. A similar fourth order square matrix can equate the four section detector signals 32' and the power in axial quarters of the core obtained from the in-core flux monitoring system during calibration of the constants. The value of $P_T$, $P_M$ and $P_B$ can be obtained from either a fixed in-core monitoring system where the in-core detectors are positioned to respectively measure the power in the top, middle and bottom portions of the core or from a movable in-core monitoring system, such as the system described in U.S. Pat. No. 3,932,211, issued Jan. 13, 1976.

Figure 4A:
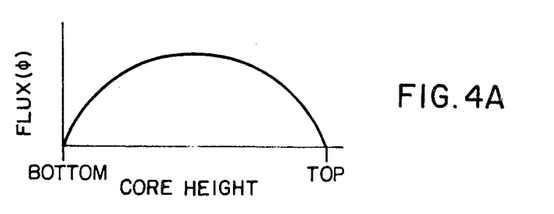
FIGS. 4A, 4B, 4C, 4D and 4E are graphical representations of the axial flux profile for various positions of the part length and full length control rods within the core.
Figure 4B:
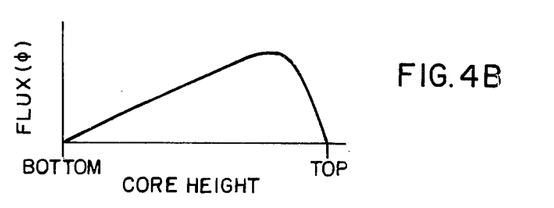
Figure 4C:
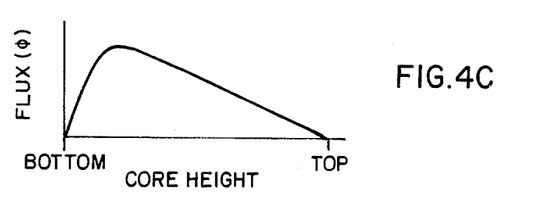
Figure 4D:
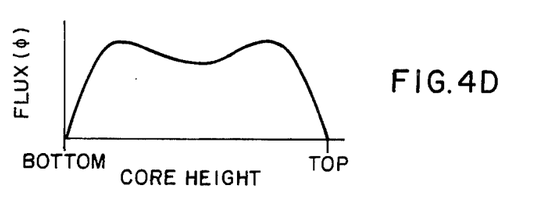
Figure 4E:
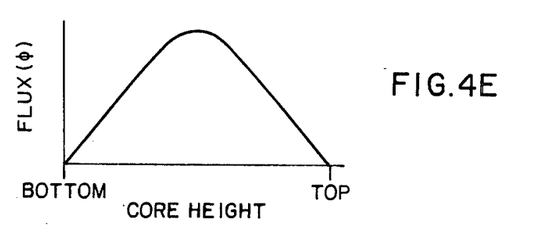

To obtain an accurate calibration of the matrix elements $A_{ij}$, the matrix element should be fitted to the observed detector currents with observed axial power distributions for five different flux distributions, such as the flux patterns illustrated in FIGS. 4A, 4B, 4C and 4D. FIG. 4A illustrates the flux distribution obtained from an in-core movable flux monitoring system with all the control rods removed from the core. FIG. 4B illustrates the flux distribution obtained with the part length rods in the bottom of the core. FIG. 4C illustrates the flux distribution obtained with part length and/or control rods in the top portion of the core. FIG. 4D illustrates the flux pattern obtained with the part length rods located in the axial center of the core. Similarly, FIG. 4E illustrates the axially pinched flux distribution obtained with the part length rods in the bottom of the core and the control rods in the top portion of the core. It should be noted that the flux maps obtained in FIGS. 4A–4E are normally obtained as part of the plant start-up measurements.

Equation (5) is rewritten generally for $n$ detectors and solved for axial power in each segment of the core in terms of detector currents as:

$$\begin{bmatrix} P_1 \\ P_2 \\ P_3 \\ \vdots \\ P_n \end{bmatrix} = \begin{bmatrix} A_{ij} \end{bmatrix}^{-1} \times \begin{bmatrix} L_1 \\ L_2 \\ L_3 \\ \vdots \\ L_n \end{bmatrix} \qquad (6)$$

where $[A_{ij}]^{-1}$ is the inverse of the matrix correlating detector response with the core powers.

The Fourier coefficients $C_n$ are obtained from the core third powers by solving the following set of equations:

$$P_T = P_1 = \int_{Z_1}^{Z_2} \phi(Z) \, dz \qquad (7)$$

$$P_M = P_2 = \int_{Z_2}^{Z_3} \phi(Z) \, dz \qquad (8)$$

$$P_B = P_3 = P_n = \int_{Z_n}^{Z_{n-1}} \phi(Z) \, dz \qquad (9)$$

where for a three axial detector arrangement $P_n = P_3 = P_B$ In matrix form, the solution can then be given by:

$$\begin{bmatrix} C_1 \\ C_2 \\ C_3 \\ \vdots \\ C_n \end{bmatrix} = \begin{bmatrix} Q_{ij} \end{bmatrix}^{-1} \times \begin{bmatrix} P_1 \\ P_2 \\ P_3 \\ \vdots \\ P_n \end{bmatrix} \qquad (10)$$

or in terms of detector currents "L":

$$\begin{bmatrix} C_1 \\ C_2 \\ C_3 \\ \vdots \\ C_n \end{bmatrix} = \begin{bmatrix} Q_{ij} \end{bmatrix}^{-1} \times \begin{bmatrix} A_{ij} \end{bmatrix}^{-1} \times \begin{bmatrix} L_1 \\ L_2 \\ L_3 \\ \vdots \\ L_n \end{bmatrix} \qquad (11)$$

where $Q_{ij} = 1/j \, [\cos(j \cdot Z_i) - \cos(j \cdot Z_{i+1})]$; and (12) where $Z_i$ are the boundaries between axial core regions that correspond to the core locations over which the core regional power $P_i$ is being calculated. The matrix $[Q_{ij}]^{-1}$ is the inverse of the matrix $Q$. In this manner, the Fourier coefficients are obtained from the multi-section detector currents and fixed matrices $\underline{Q}^{-1}$ and $\underline{A}^{-1}$. It is emphasized that these inverse matrices need only be obtained during the calibration of the system and may be either a positive or negative value. The outputs obtained from a four section detector arrangement are processed in an identical manner except that 4 × 4 matrices are involved. The equation for $Q_{ij}$ is the same. In operation, after calibration, the relative value of flux at any point within the core can be determined from the ex-core detector responses by substituting the axial coordinate of interest for Z in equation (1). In practice, the results are obtained electronically, as will be described hereinafter.

In order to simplify the processing of the detector outputs, an alternate procedure to that described above can be employed in accordance with this invention. The axial height of the core can be figuratively divided into a distinct number of coordinates sufficient to provide a meaningful point representation of the axial flux distribution within the core. For example, the core can be divided into 25 point coordinates, with the first and last coordinates falling at the core axial boundaries. In this instance, the matrix $A_{ij}$ can be expanded to 100 elements where a four axial detector arrangement is employed. The matrix elements are obtained in a similar manner to that described above by measuring the power at each of the point coordinates with a movable in-core flux mapping system (such as that described in U.S. Pat. No. 3,932,211, cited above), for the five axial flux patterns illustrated in FIG. 4. It should be appreciated that the number of flux patterns required for calibration is only equal to the number of detectors employed, but the five patterns illustrated in FIG. 4 are recommended to assure the accuracy of the calibration. The matrix elements $A_{ij}$ are obtained from a simultaneous solution of each point for the values measured for each flux pattern. The general matrix representation for obtaining a 25 point coordinate reconstruction of the core axial flux distribution is given by:

$$\begin{bmatrix} P_1 \\ \vdots \\ P_{25} \end{bmatrix} = \begin{bmatrix} A_{ij} \end{bmatrix}^{-1} \begin{bmatrix} L_1 \\ \vdots \\ L_n \end{bmatrix} \quad (13)$$

where $i$ is an integer that varies between 1 and 25, $j$ is an integer that varies between 1 and $n$ and $n$ equals the number of detector sections. Thus, the power at each point coordinate equals the sum of each of the detector outputs respectively multiplied by a corresponding constant. This latter method of processing the detector outputs considerably simplifies the circuit components required to obtain the flux information for each point. Once the point representations are obtained, the entire axial flux distribution within the core can be reconstructed. It should be emphasized that in this latter embodiment the matrix elements $A_{ij}$ appearing in Equation (13) differ from the matrix elements $A_{ij}$ forming constants in the former embodiment in Equation (11).

Due to the physical characteristics of many reactors, the maximum number of kilowatts per foot of any fuel rod within the upper region of the core is limited more severely than in other portions of the core. This is partially due to the fact that the coolant temperature is much hotter in the upper region of the core than in the lower region and that the loss of coolant accident criteria established by governmental regulation requires that the number of kilowatts per foot of any rod in the upper region of the core be limited more severely to minimize postulated consequences in the unlikely event of such an accident. In order to establish a maximum power rating, it is therefore desirable to survey the flux distribution within the upper region of the core with greater definition than the flux distribution within the remaining portion of the core. Accordingly, in accordance with one preferred embodiment of this invention, the point coordinates at which the flux is calculated in the upper region of the core can be spaced closer together than the coordinates throughout the remainder of the core.

Figure 5:
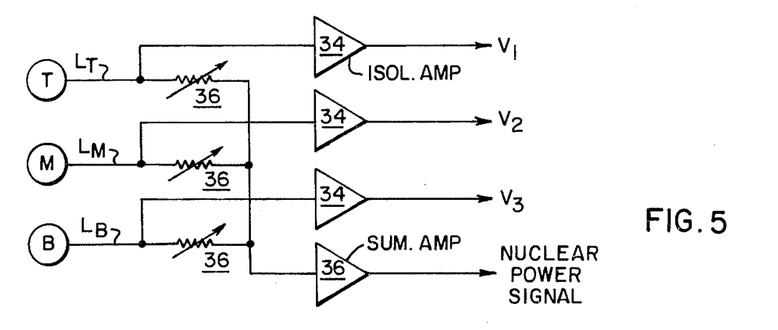
FIG. 5 is a schematic circuitry diagram of the buffering circuits employed to transform the detector responses of this invention to voltage outputs.

For an ex-core detector arrangement employing three detector sections T, M and B, such as the arrangement 32" and the latter method of signal processing described above, the corresponding detector responses $L_T$, $L_M$, and $L_B$ are coupled through corresponding isolation amplifiers 34, as illustrated in FIG. 5, to establish corresponding voltage signals $V_1$, $V_2$ and $V_3$, which are to be electrically operated upon to obtain the algebraic modification necessary to establish the flux measurements at each desired coordinate. The variable resistors 36 are employed to calibrate the respective detector outputs. In addition, the outputs of each of the respective detectors are summed by current summing amplifier 38 to establish a nuclear power signal which can be employed to normalize the flux measurements to establish an ultimate signal which can be compared to set points normally employed in the plant's operation.

Figure 6:
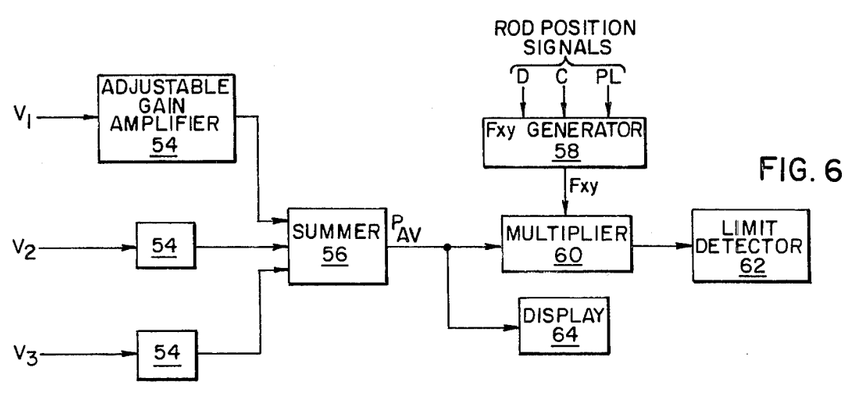
FIG. 6 is a schematic circuitry diagram of one embodiment of this invention for processing the voltage outputs of FIG. 5 to obtain the magnitude of flux at one core axial coordinate.

For each coordinate for which a flux value is to be established, the respective voltage outputs from each of the detector sections are communicated to corresponding adjustable gain amplifiers 54 having the gain set to correspond to the appropriate calibrated value of $A_{ij}$, as illustrated in FIG. 6. The respective detector section output voltages multiplied by the corresponding gain supplied by the adjustable gain amplifiers 54 are then summed by summing amplifier circuit 56 to establish an average power value over the X-Y plane for that axial coordinate. The average power for each coordinate is then multiplied by a corresponding peaking factor $F_{xy}$, which is a set parameter established by the plant manufacturer, and compared to a set point indicative of the maximum power allowable for that axial location, by the limit detector 62. If the limit is exceeded, an alarm can be sounded to alert the operator that the power in an identified portion of the core has exceeded the desired limits. In addition, the average power, $P_{av}$ can be displayed or stored by an appropriate display or storage unit 64.

Figure 7:
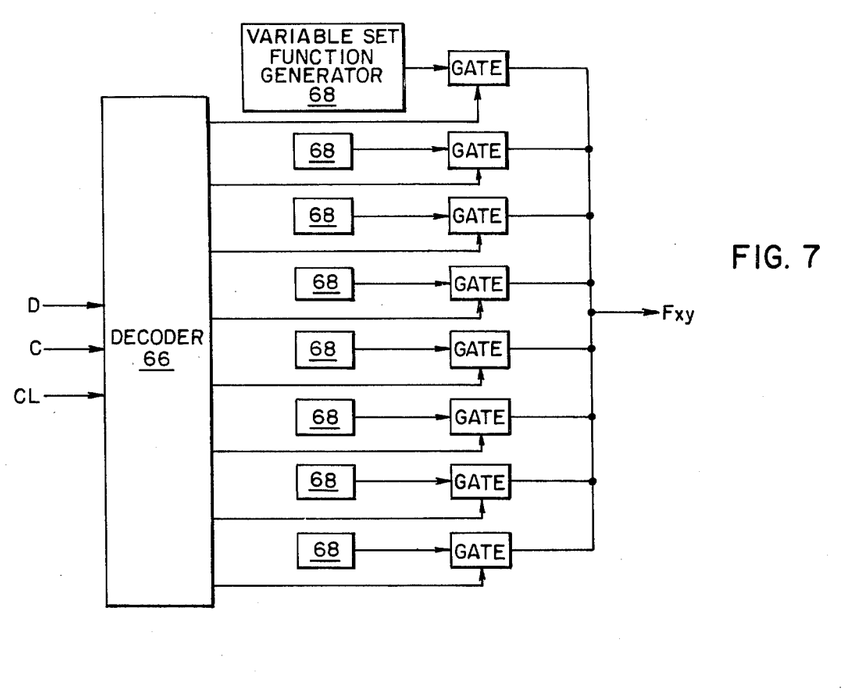
FIG. 7 is a schematic circuitry diagram of the $F_{xy}$ generator illustrated in FIG. 6.

The value of the peaking factor $F_{xy}$ will depend upon the number of control rods present at the corresponding axial coordinate. The appropriate value of $F_{xy}$ to be supplied to the multiplier 60 of FIG. 6 is provided by the circuit of FIG. 7. The decoder receives inputs from the rod postion indication system which identifies whether the rods in the part length or two control bank groups are present at the corresponding axial coordinate. Normally, only two control banks are employed over 50% power operation. One such rod position indication system which can be employed for this purpose is described in U.S. Pat. No. 3,858,191, issued Dec. 31, 1974. With the possibility of three independent rod groups being present at any given axial coordinate, there are eight possible combinations that can occur, and therefore, eight distinct flux peaking factors. The decoder 56 deciphers the proper peaking factor to be communicated to the multiplier 60 from the rod position indication of signals and connects the appropriate function generator which supplies the proper peaking factor to the multiplier 60.

Figures 8, 9:
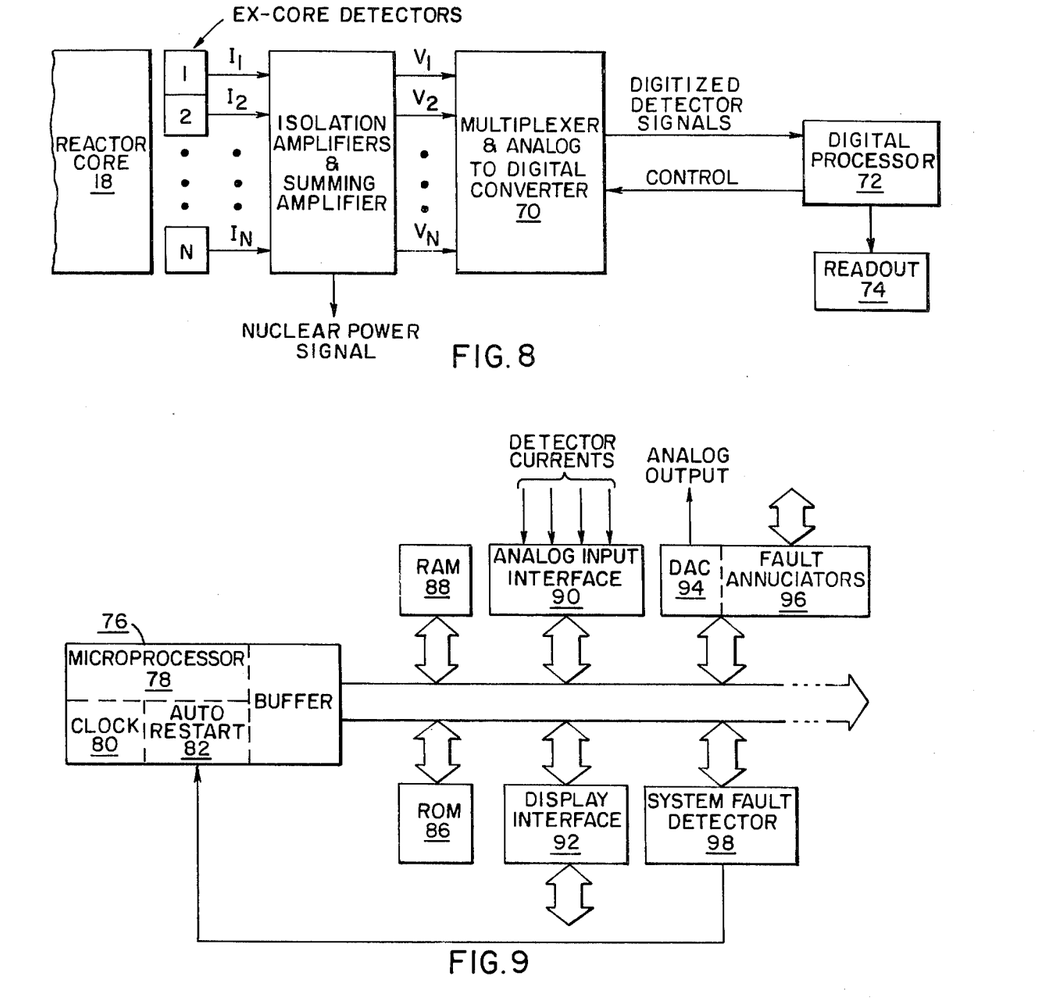
FIG. 8 is a general block diagram of an alternate embodiment of the processing electronics of this invention.
FIG. 9 is a more detailed block diagram of a portion of the system illustrated in FIG. 8.

Alternately, both the technique of Equation (13) and the Fourier expansion technique can be accomplished by the circuit generally represented by the block diagram illustrated in FIG. 8. The detector outputs are supplied to the isolation and summing amplifiers previously illustrated in FIG. 5 and converted to voltage signals which are applied to a multiplexer and analogto-digital converter unit 70. The unit 70 multiplexes the digitized detector signals to a digital processor 72, which performs the algebraic operations previously described. The reconstructed flux distribution can then be presented on a CRT display readout 74 or distributed through appropriate set point limit circuits employed in various control systems of the reactor.

A more detailed overall system block diagram for calculating the Fourier expansion or the solution to Equation (13) is illustrated in FIG. 9. The card 76 employs a microprocessor 78, such as the INTEL 8080 microprocessor manufactured by Intel Corporation, Santa Clara, California, and contains a clock 80 and power-on restart circuitry 82. The microprocessor bus 84 is buffered and then made available to the system interface cards. The system includes a read only memory 86 and a random access memory 88 for program storage. Additional interfaces include a four channel multiplex analog/digital converter for detector current inputs, digital displays 92 and enuciators 96, and a single channel digital-to-analog converter 94 for the system output. A deadman computer switch or system fault detector 98, such as the system described in U.S. Pat. No. 3,919,533, issued Nov. 11, 1975, is also included.

Figure 10:
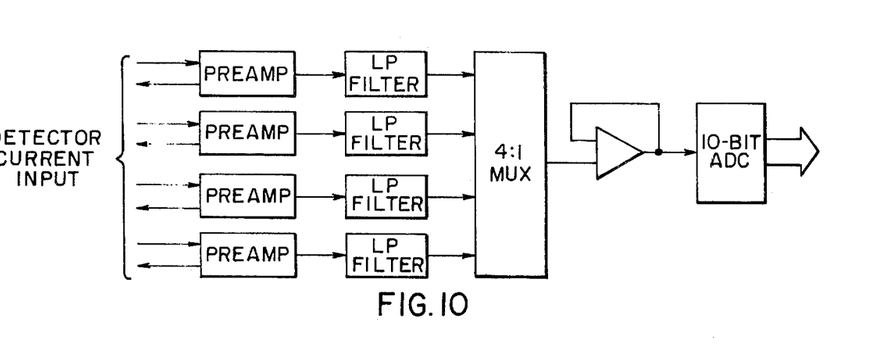
FIG. 10 is a schematic block diagram of the analog subsystem illustrated in FIG. 9.

The analog system identified in FIG. 9 is illustrated in FIG. 10 and is similar to the arrangement illustrated in FIG. 5, with the exception that the block diagram illustrated in FIG. 10 is adapted for a four section detector ex-core monitoring system. The subsystem includes four low level current preamplifiers, a multiplexer, an analog-to-digital converter and a digital-to-analog converter for the analog output. The lower level current preamplifier converts the current inputs from the respective detector sections into a high level voltage signal for use by the multiplexer. Each preamplifier is coupled through a low pass filter to negate noise encountered with the detector signal. The four filter outputs are then multiplexed prior to the analog-to-digital conversion. The analog-to-digital converter provides a 10 bit uni-polar binary conversion for the microprocessor system. When the analog-to-digital converter card is addressed, a conversion is initiated. The microprocessor must then wait (via the READY line) for the end of conversion. At the end of conversion, the microprocessor reads the least significant 8 bits from the analog-to-digital converter. A second read brings in the most significant 2 bits plus the multiplexer address. The multiplexer in this embodiment also advances its address to the next inputs.

In this embodiment a 10 bit uni-polar digital-to-analog converter 94 is also provided as an output to other analog systems.

The memory system takes on an added dimension through the use of read-only memories (ROM) for program storage. State of the art programs are employed for system calculations. The ROM facilitates an increase in system integrity to prevent alteration of the program memory. Although the system may momentarily fault, the system can reset and continue to perform correctly.

The random access memory (RAM) 88 is employed for temporary data storage during the calculations for each coordinate. A similar random access memory can also be employed with the display of FIG. 6 to store the value of flux calculated for each coordinate to enable reestablishment of the entire flux pattern from the individual point coordinates calculated.

Experimental results have confirmed that in establishing the initial constants, for example, for a three section ex-core detector system, the $\underline{\underline{A}}$ matrix elements $A_{1,3}$ and $A_{3,1}$ can be set equal to 0. This result is obtained because the top detector does not "see" the bottom third of the core and the bottom detector does not "see" the top third of the core.

Experimental results have also confirmed that the method and apparatus of this invention provide excellent correlation between the flux distributions established from ex-core and in-core detector readings.

In this way, a reliable determination of the average power at each coordinate along the axial length of the core can be determined from ex-core detector signals. Thus, the fuel rod X-Y average axial linear power density in kilowatts per foot of fuel rod is obtainable as a function of axial position. Once this information is obtained, several outputs can be implemented to establish more control over the plant operating parameters. For example:

a. The $F_z$ (X-Y average axial peaking factor) can be calculated and displayed numerically or as an analog display. By multiplying by an assumed worse case $F_{xy}$ and adding maximum error limits, a worse case $F_q$ (nuclear power density peaking factor) can be displayed.

b. The axial linear power density in kilowatts per foot can be displayed visually using a CRT or other analog display. Again, by multiplying by worse case $F_{xy}$ and adding error limits, the linear power density in kilowatts per foot for the hot fuel rod can be displayed.

c. Alarms can be generated for exceeding a preset maximum value for either (a) and/or (b) above.

d. Heat transfer correlations provide more severe limits on linear power density at higher elevations in the core due to higher cooling temperatures and/or void fractions. With this system, the limiting kilowatts per foot can be varied with axial position. Thus plant protection signals based on exceeding this limit can be implemented. Turbine runback and reactor trip signals can be generated when kilowatts per foot exceed preset limits. A $\Delta T$ protection penalty can also be generated when kilowatts per foot exceed preset limits. The $\Delta T$ penalty can be either a digital signal or converted to an analog signal for direct implementation into the $\Delta T$ protection systems already existing on operating plants.

Thus, operating reactors can be operated closer to specification limits considerably increasing their efficiency and enabling a load follow capability.

1. A method of monitoring externally of a nuclear reactor the flux distribution along a given axis of a nuclear core of the reactor, in a manner to representatively reconstruct the relative flux shape along the given axis, comprising the steps of:
monitoring the flux exterior of the reactor at at least three locations respectively positioned centered about corresponding spaced planes perpendicularly bisecting the given axis;
converting the value of flux monitored at the respective positions to corresponding electrical outputs;
figuratively dividing the given axis at a plurality of spaced coordinates sufficient to provide a meaningful reconstruction in point representation of the relative flux shape along the axis; and
electrically establishing the relative value of flux at each of the spaced coordinates from a sum of the electrical outputs respectively algebraically modified by a corresponding preestablished constant.

2. The method of claim 1 including the steps of:

predetermining the relative flux value at each of the spaced coordinates along the given axis independent of the monitored values for a number of different flux shapes equal to or greater than the number of monitoring locations;

setting the predetermined flux value for each of the different flux shapes equal to the sum of the corresponding electrical monitored outputs respectively modified by the corresponding constant represented as an unknown; and simultaneously solving for the value of each of the corresponding constants.

3. The method of claim 2 wherein the predetermined flux values are established from in-core flux monitoring instrumentation.

4. The method of claim 3 including the step of measuring the respective predetermined flux values within the core proximate the corresponding plurality of coordinates.

5. The method of claim 1 wherein the distances between coordinates varies along the length of the given axis.

6. The method of claim 5 wherein the coordinates are spaced closer together at one end of the axis then at the other end.

7. The method of claim 6 wherein the spacing between coordinates gets progressively larger from the one end of the core axis to the other.

8. The method of claim 1 wherein the monitoring locations are symmetrically positioned along an axis parallel to the given axis.

9. The method of claim 8 wherein the effective monitoring area at each location is spaced from the effective monitoring area of the adjacent monitoring location.

10. The method of claim 1 wherein the relative value of flux at each of the spaced coordinates, Z, is obtained from the Fourier expansion $$\phi_z = C_1 \sin Z + C_2 \sin 2Z + \ldots + C_n \sin(nZ)$$

where $Z$ varies along the axial height of the core between 0 and $\pi$ radians and $n$ equals the number of monitoring locations and $$\begin{bmatrix} C_1 \\ C_2 \\ \vdots \\ C_n \end{bmatrix} = \begin{bmatrix} Q_{ij} \end{bmatrix}^{-1} \times \begin{bmatrix} A_{ij} \end{bmatrix}^{-1} \times \begin{bmatrix} L_1 \\ L_2 \\ \vdots \\ L_n \end{bmatrix}$$

where $L_1$–$L_n$ are the flux values monitored at the corresponding monitoring locations, $i$ and $j$ are integers which vary between 1 and $n$ and $\underline{\underline{Q}}^{-1}$ and $\underline{\underline{A}}^{-1}$ are fixed predetermined matrices.

11. The method of claim 10 wherein $$Q_{ij} = 1/j \, [\cos(j \cdot Z_i) - \cos(j \cdot z_{i+2})]$$

further including the steps of:

figuratively segregating the core into $n$ sections along the given axis;

predetermining the power developed, P, in each core section independent of the monitored values, for a number of different flux shapes equal to or greater than $n$;

measuring the corresponding monitored value L for each value of predetermined power P; and simultaneously solving for the fixed value of the matrix elements $A_{ij}$ from the relationship $$\begin{bmatrix} P_1 \\ \vdots \\ P_n \end{bmatrix} = \begin{bmatrix} A_{ij} \end{bmatrix}^{-1} \times \begin{bmatrix} L_1 \\ \vdots \\ L_n \end{bmatrix}$$

and the corresponding values obtained for P and L from the different flux shapes.

12. Apparatus for monitoring externally of a nuclear reactor the flux distribution along a given axis of a nuclear core of the reactor in a manner to provide a representative reconstruction of the relative flux shape along the given axis comprising:

at least three detectors responsive to measured flux to provide a representative electrical output and respectively positioned exterior of the core centered about corresponding spaced planes perpendicularly bisecting the given axis; and means for electrically establishing the relative value of flux at a plurality of spaced axial coordinates sufficient to provide a meaningful reconstruction in point representation of the relative flux shape along the axis from a sum of the detector outputs respectively algebraically modified by corresponding preestablished constants.

13. The apparatus of claim 12 wherein the flux sensitive areas of the respective detectors are axially spaced from each other.

14. The apparatus of claim 12 wherein the detectors are symmetrically positioned along an axial parallel to the given axis and coextensive with the core axial height.

15. The apparatus of claim 12 wherein the detector outputs are respectively algebraically modified by corresponding amplifiers having respective gains equal to the corresponding preestablished constants.

* * * * *